(12) United States Patent
Fujimoto et al.

(10) Patent No.: US 11,514,545 B2
(45) Date of Patent: Nov. 29, 2022

(54) RIDESHARE MANAGEMENT SYSTEM, RIDESHARE MANAGEMENT METHOD, AND PROGRAM

(71) Applicant: HONDA MOTOR CO., LTD., Tokyo (JP)

(72) Inventors: Naotoshi Fujimoto, Wako (JP); Yo Ito, Tokyo (JP); Seiichi Yamamoto, Tokyo (JP); Susumu Iwamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 16/621,460

(22) PCT Filed: Jun. 15, 2018

(86) PCT No.: PCT/JP2018/022856
§ 371 (c)(1),
(2) Date: Dec. 11, 2019

(87) PCT Pub. No.: WO2018/230692
PCT Pub. Date: Dec. 20, 2018

(65) Prior Publication Data
US 2020/0175633 A1    Jun. 4, 2020

(30) Foreign Application Priority Data
Jun. 15, 2017    (JP) .............................. JP2017-117725

(51) Int. Cl.
*G01C 22/00* (2006.01)
*G06Q 50/30* (2012.01)
(Continued)

(52) U.S. Cl.
CPC ....... *G06Q 50/30* (2013.01); *B60W 60/00253* (2020.02); *G01C 21/3438* (2013.01);
(Continued)

(58) Field of Classification Search
CPC .. G06Q 50/30; G06Q 10/02; G06Q 10/06315; G06Q 2240/00;
(Continued)

(56) References Cited

U.S. PATENT DOCUMENTS

| | | | |
|---|---|---|---|
| 9,293,048 B2* | 3/2016 | Fowler | G08G 1/202 |
| 2015/0323333 A1* | 11/2015 | Lord | G06Q 50/30 |
| | | | 701/117 |
| 2016/0209220 A1* | 7/2016 | Laetz | G06Q 10/047 |

FOREIGN PATENT DOCUMENTS

| | | |
|---|---|---|
| JP | 2001-229495 | 8/2001 |
| JP | 2003-006294 | 1/2003 |

(Continued)

OTHER PUBLICATIONS

International Search Report and Written Opinion for International Application Serial No. PCT/JP2018/022856 dated Sep. 11, 2018, 7 pages.

(Continued)

*Primary Examiner* — Adam M Alharbi
(74) *Attorney, Agent, or Firm* — Amin, Turocy & Watson, LLP

(57) ABSTRACT

A rideshare management system includes: a communicator configured to communicate with a plurality of terminal devices used by a plurality of users; an acquirer configured to acquire use requests from the plurality of users in which a use condition including at least a desired access place is defined; a user arrival situation monitor configured to monitor an arrival situation of the users at a predetermined place derived according to the desired access place; and a service manager configured to search for an available vehicle according to the use condition included in the use requests and determine a vehicle service schedule and configured to determine a user accessing the vehicle at the predetermined (Continued)

place according to the arrival situation of the users monitored by the user arrival situation monitor.

17 Claims, 13 Drawing Sheets

(51) Int. Cl.
    *B60W 60/00*     (2020.01)
    *G01C 21/34*     (2006.01)
    *G05D 1/00*     (2006.01)
    *G06Q 10/02*     (2012.01)
    *G06Q 10/06*     (2012.01)

(52) U.S. Cl.
    CPC ........... *G05D 1/0088* (2013.01); *G06Q 10/02* (2013.01); *G06Q 10/06315* (2013.01); *B60W 2540/041* (2020.02); *G05D 2201/0213* (2013.01); *G06Q 2240/00* (2013.01)

(58) Field of Classification Search
    CPC ...... B60W 60/00253; B60W 2540/041; G01C 21/3438; G05D 1/0088; G05D 2201/0213
    See application file for complete search history.

(56) References Cited

FOREIGN PATENT DOCUMENTS

| | | |
|---|---|---|
| JP | 2004-062490 | 2/2004 |
| JP | 2004-295576 | 10/2004 |
| JP | 2007-180820 | 7/2007 |
| JP | 2012-088925 | 5/2012 |
| JP | 2013-182597 | 9/2013 |
| JP | 2014-191419 | 10/2014 |
| KR | 10-2015-0080460 | 7/2015 |

OTHER PUBLICATIONS

Hirata Keiji et al., "Design and implementation of platform for completely automated real-time full demand transportation system SAVS", Research report of Information Processing Society of Japan: high-degree of transportation system and smart community (ITS), 2017-ITS-068, [online], Feb. 21, 2017, pp. 1-6, ISSN:2188-8965.

Japanese Office Action for Japanese Patent Application No. 2020-005511 dated Aug. 2, 2022.

* cited by examiner

| USER ID | DESIRED BOARDING PLACE | DESTINATION | DESIRED BOARDING TIME | ALLOCATE FLAG |
|---------|------------------------|-------------|------------------------|---------------|
| 0001 | (, ) | (, ) | 2017/04/30/10:20 | 1 |
| 0002 | (, ) | (, ) | 2017/05/2/15:00 | 0 |
| ... | ... | ... | ... | ... |

| PICK-UP PLACE ID | POSITION | CONTENT OF PICK-UP PLACE | CORRESPONDENCE RANGE |
|------------------|----------|---------------------------|-----------------------|
| A | (, ) | ROTARY IN FRONT OF STATION | (, ) ~ (, ) |
| B | (, ) | CONVENIENCE STORE | (, ) ~ (, ) |
| ... | ... | ... | ... |

| VEHICLE ID | | DEPARTURE PLACE (GARAGE) | TRANSIT PLACE (1) | TRANSIT PLACE (2) | ... | TRANSIT PLACE (n-1) | TRANSIT PLACE (n) | ARRIVAL PLACE (GARAGE) |
|---|---|---|---|---|---|---|---|---|
| M-1 | COORDINATES | (,) | (,) | (,) | ... | (,) | (,) | (,) |
| | ESTIMATED TIME OF ARRIVAL | 2017/04/30/ 10:00 | 2017/04/30/ 10:30 | 2017/04/30/ 11:00 | ... | 2017/04/30/ 16:30 | 2017/04/30/ 16:45 | 2017/04/30/ 18:00 |
| | USER GETTING INTO | — | 0001 | 0004 | ... | — | — | — |
| | USER GETTING OUT OF | — | — | — | ... | 0004 | 0001 | — |
| M-2 | COORDINATES | ⋮ | ⋮ | ⋮ | ⋮ | ⋮ | ⋮ | ⋮ |
| | ESTIMATED TIME OF ARRIVAL | ⋮ | ⋮ | ⋮ | ⋮ | ⋮ | ⋮ | ⋮ |
| | USER GETTING INTO | ⋮ | ⋮ | ⋮ | ⋮ | ⋮ | ⋮ | ⋮ |
| | USER GETTING OUT OF | ⋮ | ⋮ | ⋮ | ⋮ | ⋮ | ⋮ | ⋮ |
| ... | | | | | | | | |

IM

| USER ID | NUMBER OF VEHICLE INTO WHICH BOARDING IS SCHEDULED | ARRIVING SCHEDULE TIME | CURRENT TRAVELING POSITION |
|---|---|---|---|
| 0088 | 00-11 | 12:00 | ○○CITY ○○ |
| 0048 | 00-12 | 12:15 | ○○CITY ○○ |

RIDESHARE MANAGEMENT SYSTEM, RIDESHARE MANAGEMENT METHOD, AND PROGRAM

Priority is claimed on Japanese Patent Application No. 2017-117725, filed Jun. 15, 2017, the content of which is incorporated herein by reference.

TECHNICAL FIELD

The present invention relates to a rideshare management system, a rideshare management method, and a program.

BACKGROUND ART

In the related art, the invention of a vehicle sharing support device for allowing a plurality of users to use the shared same vehicle was disclosed (see Patent Document 1). This device includes a database storage unit that stores user information and road information, an estimation processor that estimates a traveling route along which a shared vehicle travels from a departure place indicated by departure place designation information to an arrival place indicated by arrival place designation information according to the received departure place designation information and arrival place designation information from each user portable terminal, the road information stored in the database storage unit, and current positional information from a current vehicle position acquirer, and a selection processor that searches for a plurality of users who are share-riding targets getting into a shared vehicle according to the estimated traveling route for each user, selects a plurality of standby places according to easiness of arrival when the shared vehicle arrives to the standby place and easiness of standby at the time of share-riding, and gives priority to the plurality of selected standby places.

CITATION LIST

Patent Literature

[Patent Document 1]
Japanese Unexamined Patent Application, First Publication No. 2003-6294

SUMMARY OF INVENTION

Technical Problem

In the technology of the related art, although the process of changing the pick-up point depending on the time at which the vehicle arrives at the pick-up point has been disclosed, changing the vehicle into which an occupant has already gotten is not taken into account, and therefore in some cases, efficient operation may not be possible.

The present invention is devised in view of such circumstances and an object of the present invention is to supply a rideshare management system, a rideshare management method, and a program capable of realizing more efficient administration.

Solution to Problem (1) A rideshare management system includes: a communicator configured to communicate with a plurality of terminal devices used by a plurality of users; an acquirer configured to acquire use requests from the plurality of users in which a use condition including at least a desired access place is defined; a user arrival situation monitor configured to monitor an arrival situation of the users at a predetermined place derived according to the desired access place; and a service manager configured to search for an available vehicle according to the use condition included in the use requests and determine a vehicle service schedule and configured to determine a user accessing the vehicle at the predetermined place according to the arrival situation of the users monitored by the user arrival situation monitor.

(2) In the rideshare management system in (1), among vehicles traveling near the predetermined place, the service manager is configured to allow one or more vehicles to head for the predetermined place, the one or more vehicles being vehicles of which at least parts are able to be occupied and used by the users and head in destination directions of the users.

(3) In the rideshare management system in (1) or (2), when a first user included in the plurality of users approaches the predetermined place and a first vehicle allocated by the service manager arrives at the predetermined place before a second user included in the plurality of users approaches the predetermined place and when the first user is determined as a user occupying a part of the first vehicle and an occupiable portion of the first vehicle is in an occupied state and is not occupiable, the service manager may determine the second user as a user who arrives at the predetermined place later than the first vehicle and occupy a part of a second vehicle that has an occupiable portion associated with use information requested by the second user, according to comparison between a scheduled time of arrival of the second user at the predetermined place estimated according to information observed by the user arrival situation monitor and a time at which the first vehicle arrives at the predetermined place.

(4) In the rideshare management system in (3), the service manager may determine the second user as a user who occupies a part of the occupiable portion of the first vehicle when the occupiable portion of the first vehicle after the first user occupies the occupiable portion matches a use condition requested by the second user or when the user arrival situation monitor estimates that the second user approaches the predetermined place before a predetermined time passes after the first vehicle arrives at the predetermined place.

(5) In the rideshare management system in (3), the second user may be a service provider associated with the predetermined place. When there is an occupiable portion which is unreserved and is usable in the first vehicle after the first user occupies the occupiable portion of the first vehicle, the service manager may determine the second user as a user who occupies the unreserved occupiable portion of the first vehicle regardless of an estimated time of arrival of the second user.

(6) In the rideshare management system in any one of (1) to (5), the user arrival situation monitor may monitor an arrival situation of the user at the predetermined place according to positional information specified by a position specifying device included in a terminal device held by the user.

(7) In the rideshare management system in any one of (1) to (6), the user arrival situation monitor may monitor the arrival situation of the user at the predetermined place according to an input operation performed on an input device provided at the predetermined place.

(8) The rideshare management system in any one of (1) to (7) may further include a service publisher configured to grant a usable privilege to a user associated with the use request with reference to a correspondence relation between the predetermined place and the service provider according to a use situation of the vehicles.

(9) In the rideshare management system in any one of (1) to (8), the predetermined place may be a service provider. The rideshare management system may further include a granter that is configured to grant incentive information to a supervisor who manages the service provider, the users, or the rideshare management system with reference to a use situation of the service provider and a use situation of the vehicles.

(10) In the rideshare management system in any one of (1) to (9), the service manager may derive a predetermined place which is a use place with regard to the desired access place according to comparison between the desired access place and the predetermined place and supply information regarding the derived use place to the users.

(11) In the rideshare management system in any one of (1) to (10), when the acquirer is configured to acquire the use request transmitted by the portable first terminal, the service manager may grant an option to select a vehicle in which a space is occupied simultaneously with another user or for only the user associated with the use request to occupy the vehicle, to the first terminal transmitting the use request.

(12) In the rideshare management system in any one of (1) to (11), the service manager may derive a time at which a vehicle heading for the predetermined place arrives at the predetermined place and supply the derived time to the users.

(13) In the rideshare management system in any one of (1) to (12), the service manager may supply the users with information for specifying the vehicle heading for the predetermined place.

(14) In the rideshare management system in any one of (1) to (13), the service manager may supply the user with information for using the occupiable portion of the vehicle.

(15) The rideshare management system in any one of (1) to (14) may further include an access controller configured to set a half-way stop position of the vehicle and permit access to the occupiable portion of the vehicle to a third party at the half-way stop position.

(16) In the rideshare management system in any one of (1) to (15), the vehicle may be an automated driving vehicle.

(17) A rideshare management method causes a computer to: communicate with a plurality of terminal devices used by a plurality of users; acquire use requests from the plurality of users in which a use condition including at least a desired access place is defined; monitor an arrival situation of the users at a predetermined place derived according to the desired access place; search for an available vehicle according to the use condition included in the use requests and determine a vehicle service schedule; and determine a user accessing the vehicle at the predetermined place according to the monitored arrival situation of the users.

(18) A program causes a computer to: communicate with a plurality of terminal devices used by a plurality of users; acquire use requests from the plurality of users in which a use condition including at least a desired access place is defined; monitor an arrival situation of the users at a predetermined place derived according to the desired access place; search for an available vehicle according to the use condition included in the use requests and determine a vehicle service schedule; and determine a user accessing the vehicle at the predetermined place according to the monitored arrival situation of the users.

Advantageous Effects of Invention

According to (1) to (6), (9), (11), (14), and (16) to (18), the service manager is configured to determine a user who uses a vehicle at a predetermined place according to an arrival situation monitored by a user arrival situation monitor, and thus it is possible to realize more efficient administration.

According to (7), the user arrival situation monitor can monitor an arrival situation of a user who does not carry a portable terminal device. As a result, even the user who does not carry the portable terminal device can use the rideshare management system.

According to (8), since a user can obtain a privilege of use in a store associated with the predetermined place, it is possible to improve convenience for the users.

According to (10), when the service manager is configured to supply a user with the information regarding the use place according to comparison between a desired access place and the predetermined place, the user can acquire information regarding the use place easily. Since users gather in the use place, an opportunity for a store to supply goods or a service to a user increase when the use place is a store (a convenience store, a restaurant, or the like).

According to (12) and (13), since the user is supplied with a time at which the allocated vehicle arrives at the pick-up place or information for specifying a vehicle heading for the pick-up place, it is possible to further improve convenience for the users.

According to (15), since a third party can access the occupiable portion at the half-way stop position, it is possible to complete a task which is performed by joining with the vehicle or it is possible to transfer goods. As a result, it is possible to further improve convenience for the users.

BRIEF DESCRIPTION OF DRAWINGS

FIG. 4 is a diagram showing an example of content of boarding condition information 384.

FIG. 5 is a diagram showing an example of content of pick-up place information included in map information 386.

FIG. 6 is a diagram showing an example of content of service schedule information 388.

DESCRIPTION OF EMBODIMENTS

Hereinafter, an embodiment of a rideshare management system, a rideshare management method, and a program according to the invention will be described with reference to the drawings. The rideshare management system including the rideshare management device is an apparatus that supports shared use (rideshare) of one or more vehicles by a plurality of users. A vehicle used for rideshare is, for example, an automated driving vehicle for which driving operations are basically not necessary. Hereinafter, an automated driving vehicle that is used for rideshare will be described, but a non-automated driving vehicle may be used.

When a use request (for example, a boarding request) is acquired through communication from a user, the rideshare management device searches for a vehicle (an available vehicle) that matches a use condition (for example, a boarding condition) defined in the use request (boarding request). The communication may include both data communication and voice communication, that is, phoning. In the following embodiment, an example in which a user gets into an allocated vehicle will be described. However, for example, a user different from the user transmitting the use request instead of the user (or in addition to the user) may get into the vehicle or an occupiable portion (a seat or a trunk) of the vehicle may be occupied by an object such as luggage managed by the user.

Figure 1:
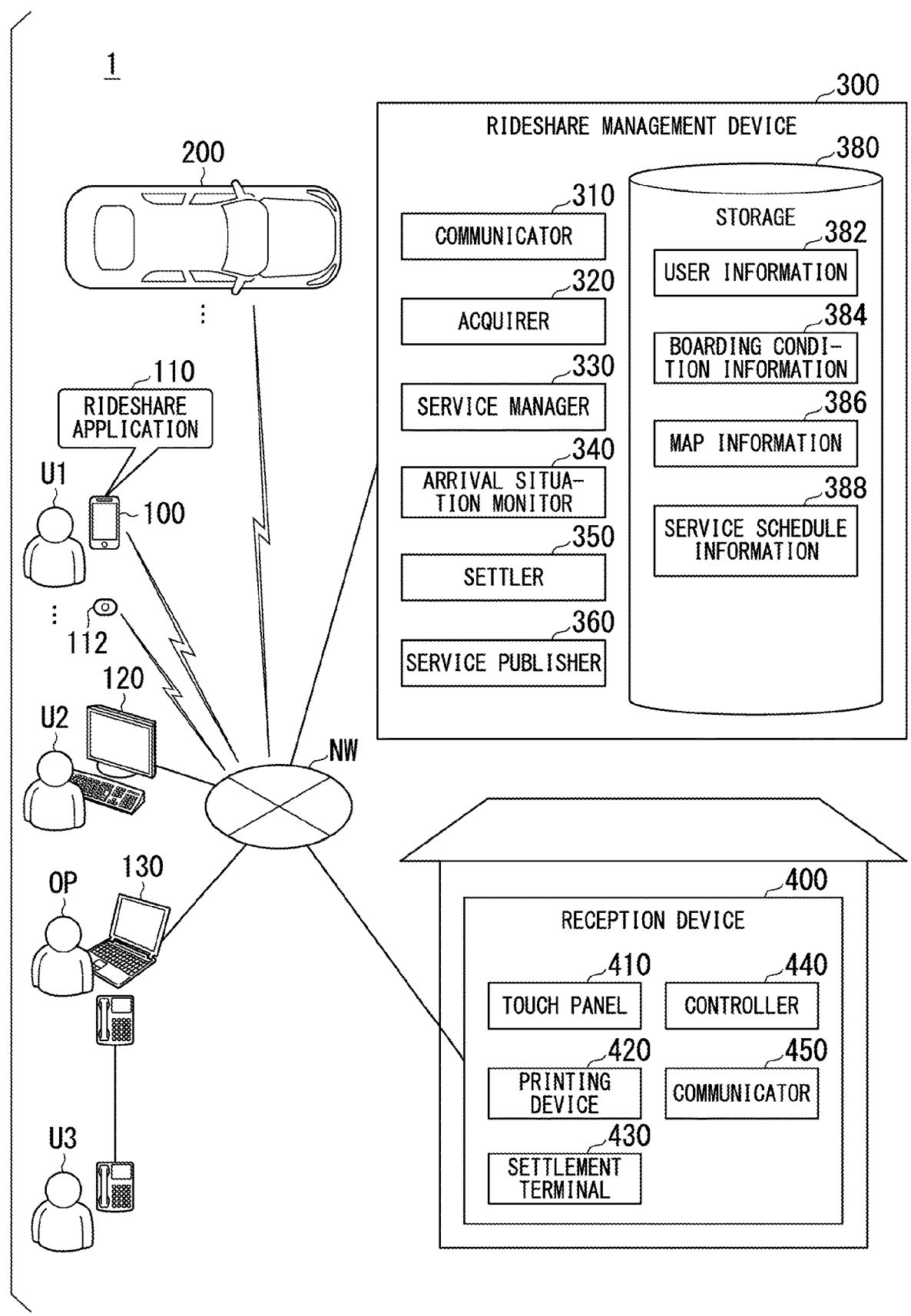
FIG. 1 is a diagram showing a configuration of a rideshare management system 1 including a rideshare management device 300.

FIG. 1 is a diagram showing a configuration of a rideshare management system 1 including a rideshare management device 300. The rideshare management system 1 includes one or more terminal devices 100 used by one or more users, one or more push button terminal devices 112 used by one or more users, one or more terminal devices 120 used by one or more users, a terminal device 130 used by an operator OP who prepares for allocating one more vehicles, one or more vehicles 200, the rideshare management device 300, and one or more reception devices 400. These constituent elements can communicate with one another via a network NW. The network NW includes the Internet, a wide area network (WAN), a local area network (LAN), a public communication line, a provider device, a dedicated line, and a wireless base station. The "use by a user" may include temporary use of a terminal device or the like in an Internet cafe by a user U.

The terminal device 100 is, for example, a portable terminal such as a smartphone or a tablet terminal which can be carried by a user. The terminal device 100 activates an application program, a browser, or the like for using the rideshare management system to support a service to be described below. In the following description, it is assumed that the terminal device 100 is a smartphone and an application program (rideshare application 110) is activated. The rideshare application 110 communicates with the rideshare management device 300 in response to an operation by the user U and transmits a request of the user U to the rideshare management device 300, or performs push communication according to information received from the rideshare management device 300. The terminal device 100 acquires positional information specified by a position specifier of the terminal device 100 and transmits a user ID and positional information of the terminal device 100 at a predetermined interval to the rideshare management device 300. Hereinafter, a user using the terminal device 100 is referred to as a "user U1."

The push button terminal device 112 is, for example, a terminal device that includes a pressing type push button and a communicator. The communicator is connected to, for example, the network NW through wired communication or wireless communication and communicates with the rideshare management device 300 via the network NW. When a user U presses a pressing type push button, a boarding request is transmitted to the rideshare management device 300. The boarding request is a request indicating that the user U desires to get into the vehicle 200 at a preset pick-up place.

The push button terminal device 112 may include a plurality of push buttons. For example, when a different pick-up place is associated with each push button and a predetermined push button is pressed, the push button terminal device 112 transmits a boarding request associated with the pressed push button to the rideshare management device 300. The rideshare management system 1 may include the push button terminal device 112 for each of a plurality of pick-up places. For example, the push button terminal device 112 may be provided inside a predetermined facility, near a road for a pedestrian, or the like. The push button terminal device 112 may transmit a boarding request to the rideshare management device 300 via the reception device 400.

The terminal device 120 is, for example, a personal computer placed in a home or the like of a user. The terminal device 120 activates a browser or the like and supports a service to be described below. A user using the terminal device 120 is referred to as a "user U2."

The terminal device 130 is a terminal device used when an operator performs allocating in response to a request from a user U3. A user that requests the operator OP to prepare for allocating a vehicle via a telephone or the like is referred to as a "user U3."

Figure 2:
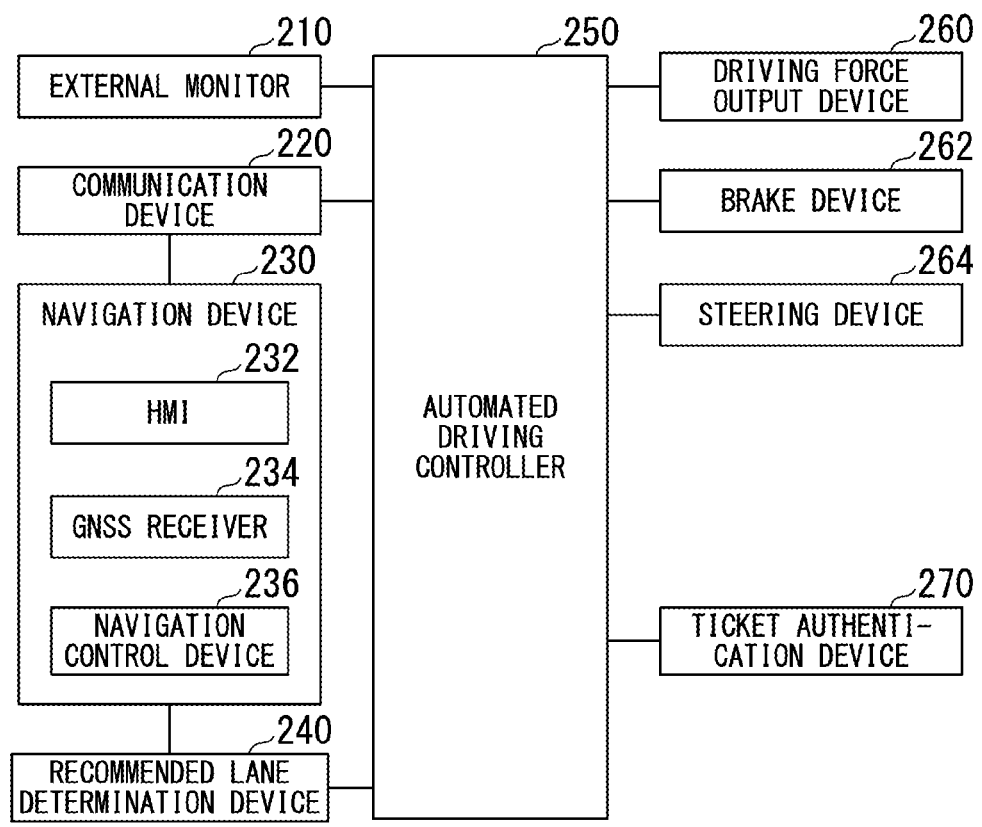
FIG. 2 is a diagram showing a configuration of a vehicle 200.

The vehicle 200 is, for example, a vehicle that has greater than or equal to four wheels and which a plurality of users U are able to board, but may be another vehicle such as a motorbike. FIG. 2 is a diagram showing a configuration of the vehicle 200. The vehicle 200 includes, for example, an external monitor 210, a communication device 220, a navigation device 230, a recommended lane determination device 240, an automated driving controller 250, a driving force output device 260, a brake device 262, a steering device 264, and a ticket authentication device 270.

The external monitor 210 includes, for example, a camera or a radar, a light detection and ranging (LIDAR) finder, and an object recognition device or the like that performs a sensor fusion process according to an output of the camera, the radar, or LIDAR finder. The external monitor 210 estimates kinds of objects (in particular, vehicles, pedestrians, and bicycles) around the vehicle 200 and outputs the kinds of objects to the automated driving controller 250 along with information regarding positions or speeds of the objects.

The communication device 220 is, for example, a wireless communication module that is connected to the network NW or directly communicates with another vehicle or a terminal device or the like of a pedestrian. The communication device 220 performs wireless communication according to Wi-Fi, dedicated short range communications (DSRC), Bluetooth (registered trademark), or another communication standard. The plurality of communication devices 220 may be prepared in accordance with purposes.

The navigation device 230 includes, for example, a human machine interface (HMI) 232, a global navigation satellite system (GNSS) receiver 234, and a navigation control device 236. The HMI 232 includes, for example, a touch panel display device, a speaker, and a microphone. The GNSS receiver 234 determines an own position (the position of the vehicle 200) according to radio waves arriving from GNSS satellites (for example, GPS satellites). The navigation control device 236 includes, for example, a central processing unit (CPU) and various storage devices and performs overall control of the navigation device 230. A storage device stores map information (a navigation map). The navigation map is a map in which roads are indicated using nodes and links. The navigation control device 236 determines a route from the position of the vehicle 200 positioned by the GNSS receiver 234 to a destination designated using the HMI 232 with reference to the navigation map. The navigation control device 236 may transmit the destination and the position of the vehicle 200 to a navigation server (not shown) using the communication device 220 and acquire a route returned by the navigation server. In the case of the embodiment, the route to the destination is designated by the rideshare management device 300 in some cases. The route may include information regarding a stopping place and a target time of arrival to allow a user to get into or get out of the vehicle. The navigation control device 236 outputs the information regarding a route determined in accordance with any of the foregoing methods to the recommended lane determination device 240.

The recommended lane determination device 240 includes, for example, a map positioning unit (MPU) and various storage devices. A storage device stores highly accurate map information that is more detailed than that of the navigation map. The highly accurate map information includes, for example, information such as road widths, gradients, curvatures of respective lanes, and traffic signal positions. The recommended lane determination device 240 determines a preferred recommended lane to travel along a route input from the navigation device 230 and outputs the recommended lane to the automated driving controller 250.

The automated driving controller 250 includes one or more processors such as a CPU or a micro processing unit (MPU) and various storage devices. The automated driving controller 250 causes the vehicle 200 to automatically drive so that the vehicle 200 avoids contact with objects of which positions or speeds are input from the external monitor 210 on the principle that the vehicle 200 travels along a recommended lane determined by the recommended lane determination device 240. The automated driving controller 250 performs, for example, various events in sequence. Examples of the events include a constant speed traveling event for traveling at a constant speed in the same travel lane, a following traveling event for following a front traveling vehicle, a lane changing event, a joining event, a branching event, an emergency stopping event, a toll gate event for passing through a toll gate, and a handover event for ending automated driving and switching to non-automated driving. An action for avoidance is planned according to a surrounding situation (presence of a surrounding vehicle or pedestrian, contraction of a lane due to road construction, or the like) of the vehicle 200 while such an event is being performed in some cases.

The automated driving controller 250 generates a target trajectory along which the vehicle 200 travels in future. The target trajectory includes, for example, speed components. For example, the target trajectory is expressed by arranging places (trajectory points) at which the vehicle 200 will arrive in sequence. The trajectory point is a place at which the vehicle 200 will arrive for each predetermined traveling distance. Apart from the trajectory points, target acceleration and a target speed are generated as parts of the target trajectory for each of predetermined sampling times (for example, about every several tenths of a second [sec]). The trajectory point may be a position at which the own vehicle 200 will arrive at the sampling time for each predetermined sampling time. In this case, information regarding the target acceleration or the target speed is expressed at an interval between the trajectory points.

Figure 3:
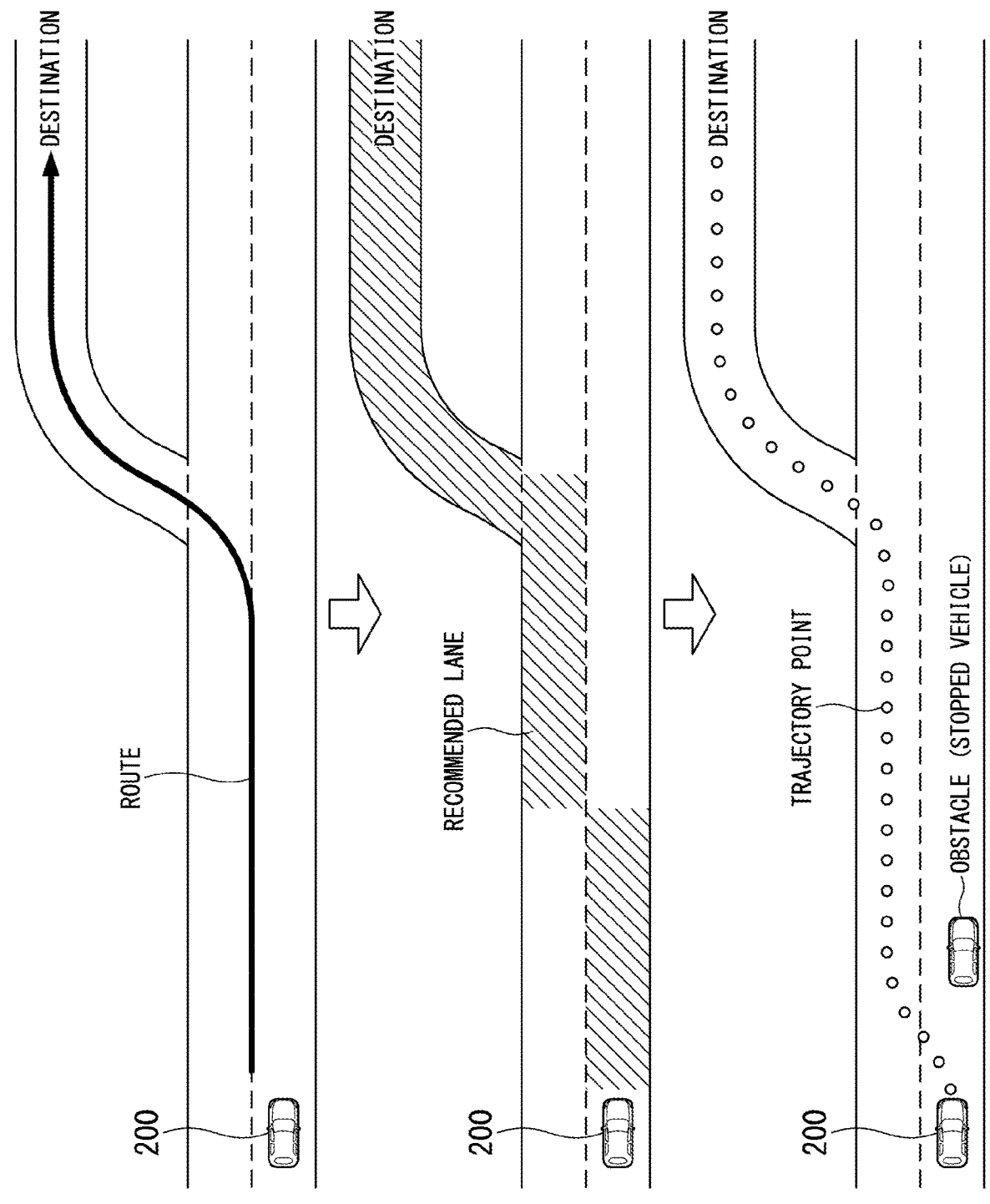
FIG. 3 is a diagram showing a procedure of an automated driving process.

FIG. 3 is a diagram showing a procedure of an automated driving process. First, as shown in the upper drawing, the navigation device 230 determines a route. This route is, for example, a rough route in which lanes are not distinguished. Subsequently, as shown in the middle drawing, the recommended lane determination device 240 determines a recommended lane in which the vehicle easily travels along a route. As shown in the lower drawing, the automated driving controller 250 generates trajectory points for traveling along the recommended lane if possible, for example, while avoiding obstacles and controls some or all of the driving force output device 260, the brake device 262, the steering device 264 such that the vehicle travels along the trajectory points (and a subordinate speed profile). The role sharing is merely exemplary and, for example, the automated driving controller 250 may perform processes unitarily.

The driving force output device 260 outputs a travel driving force (torque) for causing the vehicle to travel to a driving wheel. The driving force output device 260 includes, for example, a combination of an internal combustion engine, an electric motor and a transmission, and a power ECU controlling these units. The power ECU controls the foregoing configuration in accordance with information input from the automated driving controller 250 or information input from a driving operator (not shown).

The brake device 262 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the automated driving controller 250 or information input from the driving operator such that a brake torque in accordance with a brake operation is output to each wheel. The brake device 262 may include a mechanism that transmits a hydraulic pressure generated in response to an operation of the brake pedal included in the driving operator to the cylinder via a master cylinder as a backup. The brake device 262 is not limited to the above-described configuration and may be an electronic control type hydraulic brake device that controls an actuator in accordance with information input from the automated driving controller 250 such that a hydraulic pressure of the master cylinder is transmitted to the cylinder.

The steering device 264 includes, for example, a steering ECU and an electric motor. For example, the electric motor may change the direction of the steered wheels by applying a force to a rack and pinion mechanism. The steering ECU drives the electric motor to change the direction of the steering wheel in accordance with information input from the automated driving controller 250 or information input from the driving operator.

The ticket authentication device 270 includes a reader and an authenticator. The reader reads a boarding code printed on a medium or a boarding code drawn on an image displayed on a display of the terminal device 100. Hereinafter, the boarding code is referred to as a ticket in some cases. The foregoing code is a code that is supplied to user after the user reserves allocate and settlement is completed.

The code is, for example, a barcode or a QR (registered trademark) code. For example, information such as a user ID, a destination of an occupant, a one-time key is encoded in the code. The authenticator reads the information encoded in the code held up to a reader of the own device, decodes the read information, and acquires electronic information. Then, when the information read by the reader matches information (for example, a user ID or a one-time key) received in advance from the rideshare management device 300, the authenticator permits the user holing up the ticket to the reader to get into a vehicle. When the read information does not match the information, the authenticator does not permit the user to get into the vehicle. The authenticator may transmit the acquired information to the rideshare management device 300 and may make a request for transmitting a determination result of whether to permit the user holding up the ticket to get into the vehicle to the rideshare management device 300.

When a desire of an unreserved user to use the allocated vehicle 200 is detected, the service manager 330 may prepare another vehicle 200 different from the allocated vehicle 200 to correspond to the desire of the unreserved user to use the allocated vehicle 200. The unreserved user is a user who is not included in a service schedule of the allocated vehicle 200. For example, when a user ID is acquired from an image held up to the unreserved user, the ticket authentication device 270 transmits the acquired user ID to the rideshare management device 300. When the received user ID is a user ID of the unreserved user, the rideshare management device 300 embeds the user ID of the unreserved user in the service schedule and transmits information indicating permission for the unreserved user to get into the vehicle 200 to the vehicle 200. Thus, the unreserved user can get into the vehicle 200 which is unreserved and is nearby. When the unreserved user is allowed to get into the vehicle 200 and the user of which the user ID is embedded in to the service schedule by advanced reservation may not get into the vehicle 200, the rideshare management device 300 allocates another vehicle 200 for the user who may not get into the vehicle 200. As a result, it is possible to improve convenience for an unreserved user without deteriorating convenience of a reserved user.

In the foregoing example, when the user ID of an unreserved user is acquired, an authentication device of the vehicle 200 may permit the unreserved user to get into the vehicle 200. In this case, when the unreserved user is allowed to get into the vehicle 200 and the reserved user may not get into the vehicle 200, the vehicle 200 may request the rideshare management device 300 to allocate another vehicle 200.

Referring back to FIG. 1, the rideshare management device 300 includes, for example, a communicator 310, an acquirer 320, a service manager 330, an arrival situation monitor 340, a settler 350, a service publisher 360, and a storage 380.

The communicator 310 is, for example, a network card connected to the network NW. The storage 380 is realized by a hard disk drive (HDD), a flash memory, a random access memory (RAM), a read-only memory (ROM), or the like. The communicator 310 communicates with the terminal device 100 or the vehicle 200 via the network NW.

The acquirer 320 and the service manager 330, the arrival situation monitor 340, the settler 350, and the service publisher 360 are realized, for example, when a processor such as a CPU executes a program (software) stored in the storage 380. Some or all of the functional units may be realized by hardware such as a large scale integration (LSI), an application specific integrated circuit (ASIC), or a field-programmable gate array (FPGA), or a graphics processing unit (GPU) or may be realized by software and hardware in cooperation.

The acquirer 320 acquires vehicle information transmitted by the vehicle 200 via the communicator 310 and the network NW. The vehicle information includes, for example, a vehicle ID, positional information of the vehicle 200, and information regarding an occupant getting into the vehicle 200. The acquirer 320 acquires a boarding request output from the terminal device 100, 120, or 130 via the communicator 310 and the network NW and registers a boarding condition (an example of a "use condition") included in the boarding request as boarding condition information 384 in the storage 380.

FIG. 4 is a diagram showing an example of content of the boarding condition information 384. As shown, the boarding condition information 384 is information in which a desired boarding place (an example of a "desired access place"), a destination, a desired boarding time, an allocate flag indicating whether allocate is determined (for example, 1 indicates that allocate is determined and 0 indicates that allocate is not determined), and the like are associated with a user ID which is identification information of a user registered in advance. Content of information other than the allocate flag is determined by allowing the rideshare application of the terminal device 100 to receive an input of a user and is transmitted as a boarding request to the rideshare management device 300. The desired boarding place may be any place or may be a preset pick-up place included in map information 386 to be described below. Hereinafter, a series of information associated with one user ID in the boarding condition information 384 is referred to as a record in some cases.

The service manager 330 searches for the available vehicle 200 with reference to the boarding condition information 384, the map information 386, and the service schedule information 388. The map information 386 includes pick-up place information indicating an overview of various pick-up places in addition to information regarding nodes or links (a navigation map or a high-precise map of the vehicle 200 may include such information). FIG. 5 is a diagram showing an example of content of pick-up place information included in the map information 386. The pick-up place information is, for example, information in which a position, content of a pick-up place, a correspondence range which is one or more desired boarding places, and the like are associated with a pick-up place ID which is identification information of the pick-up place at which the vehicle 200 goes to meet users. The pick-up place is, for example, a rotary in front of a station, a service provider (for example, a store such as a convenience store). The pick-up place is an example of a "predetermined place."

For example, the service manager 330 roughly groups records in which periods of time and travel sections from a pick-up place to a destination are close among records included in the boarding condition information 384, extracts one or more records according to a grouped result, and registers the records as a part of service schedule information 388 in the storage 380.

FIG. 6 is a diagram showing an example of content of the service schedule information 388. As shown, the service schedule information 388 is information in which coordinates of a departure place, a transit place, and an arrival place, a user ID of a user getting into at each transit place, and a user ID of a user getting out of are associated with a vehicle ID which is identification information of the vehicle 200 managed by the rideshare management device 300. The departure place or the arrival place is normally a garage or the like. Information regarding a "vacant vehicle" of which a service schedule has not yet been determined is also registered in the service schedule information 388. In this case, for a vacant vehicle, only coordinates of a departure place are registered. The service manager 330 may collect boarding requests from a plurality of users and determine a service schedule of one vehicle 200, as described above, or may search for a service schedule determined in advance and change the service schedule so that boarding requests from other users are included in the already determined service schedule. That is, when the service manager 330 searches for the available vehicle 200, the service manager 330 may search for the vehicle 200 of which the boarding schedule is not yet determined or may search for a boarding schedule of the already determined vehicle 200 which can include a boarding request of a user. The transit place is a position at which an occupant gets out of the vehicle 200 or a pick-up place of the vehicle 200. At a predetermined timing, the service manager 330 transmits information regarding a route (transit place) according to the service schedule information 388 and an estimated passage time (time of arrival) to the vehicle 200.

The service manager 330 determines a user who gets into a vehicle at a predetermined place according to an arrival situation of the users monitored by the arrival situation monitor 340. Information regarding the determined user is transmitted to, for example, the vehicle 200 into which the user gets. Further, the service manager 330 derives a pick-up place associated with a desired boarding place with reference to the map information 386.

The arrival situation monitor 340 monitors an arrival situation of the users at the predetermined place derived according to the desired boarding place. The arrival situation monitor 340 monitors the arrival situation of the users according to positional information specified by a position specifying device included in the terminal device 100 or an input operation performed on an input unit of the reception device 400 provided at the predetermined place.

The settler 350 performs settlement of use of the vehicle 200 according to the information transmitted by the terminal device 100 or the information transmitted by the reception device 400 provided at the pick-up place. The settler 350 may request a settlement server device (not shown) to perform the settlement. The service publisher 360 grants a privilege to the user associated with the boarding request according to a vehicle use situation. The privilege is a privilege that can be used in a store associated with the predetermined place. The granting of the privilege to the user is transmission of information for causing a display to display the privilege that can be used in the store to the terminal device 100 of the user. For example, the service publisher 360 grants a privilege that can be used in a service provider to the user. For example, with reference to correspondence information in which a correspondence relation between a pick-up place (predetermined place) and a service provider (for example, a store) is regulated, the service publisher 360 grants a privilege that can be used in the service provider and is included in the correspondence information to the user. The service publisher 360 may supply information regarding the privilege to the reception device 400 according to a settlement result of the settler 350. A controller 440 of the reception device 400 may cause, for example, a printing device 420 to print the information regarding the privilege on a medium and issue the information regarding the privilege. The privilege information is privilege information which can be used in a store in which the reception device 400 is provided. The privilege information is information with which the privilege can be received in a store which is a pick-up place.

Referring back to FIG. 1, the reception device 400 includes, for example, a touch panel 410, the printing device 420, a settlement terminal 430, the controller 440, and a communicator 450. The reception device 400 is provided near a pick-up place or inside a store, for example, when the pick-up place is a store. The touch panel 410 includes a display unit and an input unit. The printing device 420 issues a ticket according to a process by the controller 440. The settlement terminal 430 requests the settler 350 to perform settlement in response to an operation on the input unit and acquires a result in accordance with the request.

The controller 440 transmits content of an operation performed by the user using the communicator 450 and a process result to the rideshare management device 300. The controller 440 causes the printing device 420 to print information indicating the privilege according to a settlement result of the settlement terminal 430. The controller 440 is another example of a "service publisher." The controller 440 may cause the printing device 420 to print the information indicating the privilege according to the information transmitted by the service publisher 360. The communicator 450 is, for example, a network card for connection to the network NW.

Figure 7:
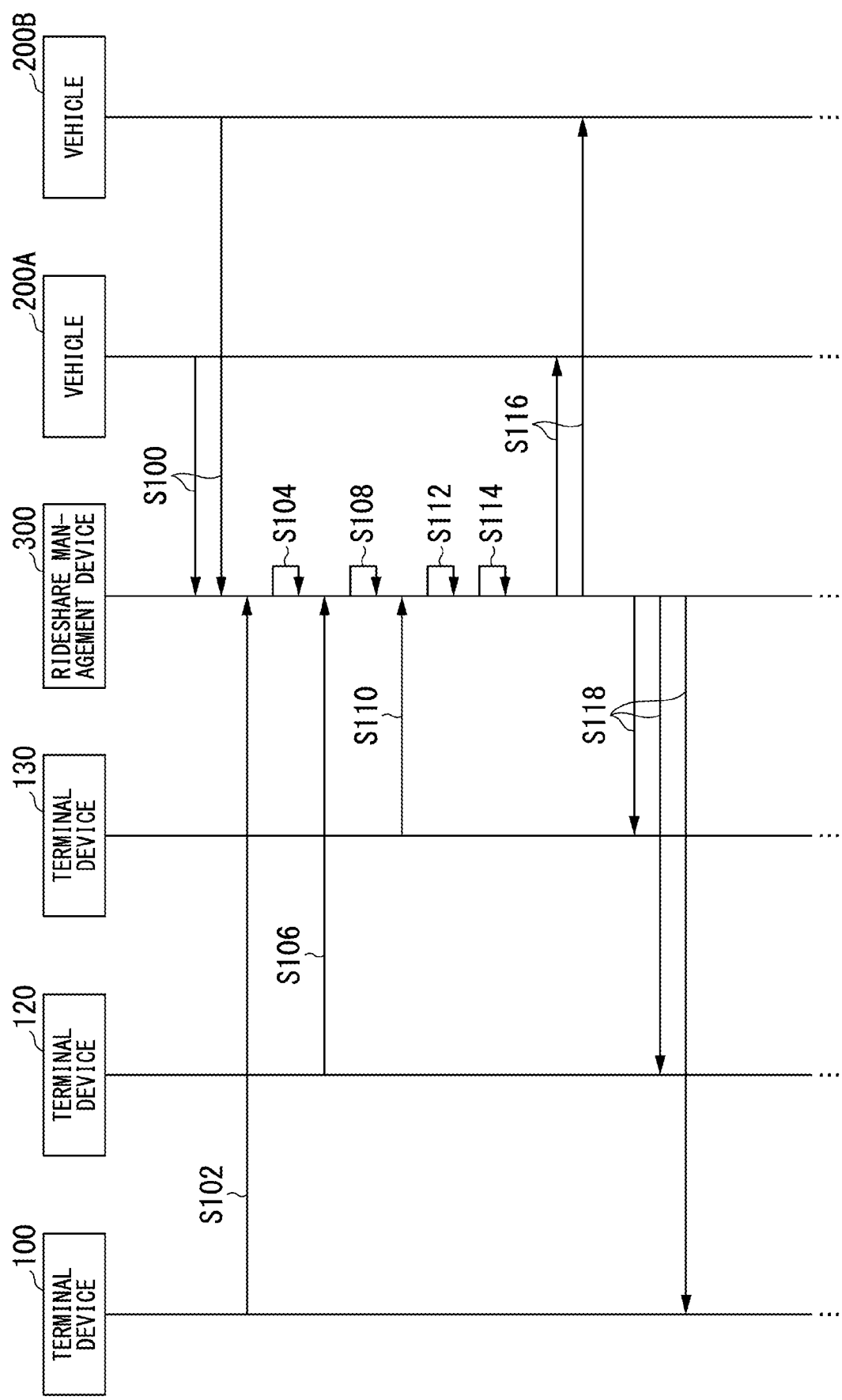
FIG. 7 is a sequence diagram showing a process performed by the rideshare management system 1 at the time of allocating of a vehicle.

FIG. 7 is a sequence diagram showing a process performed by the rideshare management system 1 at the time of allocating of a vehicle. First, the rideshare management device 300 acquires vehicle information transmitted by the vehicles 200 (200A and 200B) at any time (step S100). In the process, for example, two seats are vacant in the vehicle 200A and one seat is vacant in the vehicle 200B. Subsequently, the rideshare management device 300 acquires a boarding request transmitted by the terminal device 100 (step S102) and registers the acquired information in the storage 380 (step S104). Subsequently, the rideshare management device 300 acquires the boarding request transmitted by the terminal device 120 (step S106) and registers the acquired information in the storage 380 (step S108). Subsequently, the rideshare management device 300 acquires the boarding request transmitted by the terminal device 130 (step S110) and registers the acquired information in the storage 380 (step S112). In this way, the rideshare management device 300 collects the vehicle information and the boarding requests transmitted by the terminal devices 100, 120, and 130.

Subsequently, the rideshare management device 300 generates the service schedule information 388 according to the boarding condition information 384 and the vehicle information (step 114). For example, the service manager 330 specifies the pick-up places associated with the desired boarding place included in the boarding request with reference to the map information 386. The service manager 330 extracts a record in which the specified pick-up places are the same and the desired boarding time is within a predetermined time from the boarding condition information 384. Then, the service manager 330 calculates the number of users associated with the extracted record and allocates the vehicle into which the user can get at a time close to the desired boarding time or within a predetermined time (for example, 30 minutes or 1 hour) from the desired boarding time. The allocated vehicles are vehicles which will be traveling close to pick-up places near the desired boarding times (near the pick-up places) and of which destinations match destinations of the users. The matching includes passing near the destination of the users of which the destinations are the same or close or heading directions are close. For example, a vehicle into which two users of users U1 to U3 get is assumed to be the vehicle 200A and a vehicle into which one user gets is assumed to be the vehicle 200B. In the process, it is assumed that destinations of the users U1 to U3, the vehicle 200A, and the vehicle 200B are the same and pick-up places of the users U1 to U3 are the same.

Subsequently, the rideshare management device 300 instructs the vehicles 200A and 200B to head for the pick-up places according to the generated service schedule (step S116). Subsequently, the rideshare management device 300 transmits the pick-up places or pick-up times associated with the boarding requests in the generated service schedule information to the terminal devices 100, 120, and 130 (step S118). Thus, reservation is completed in response to the boarding request.

Figure 8:
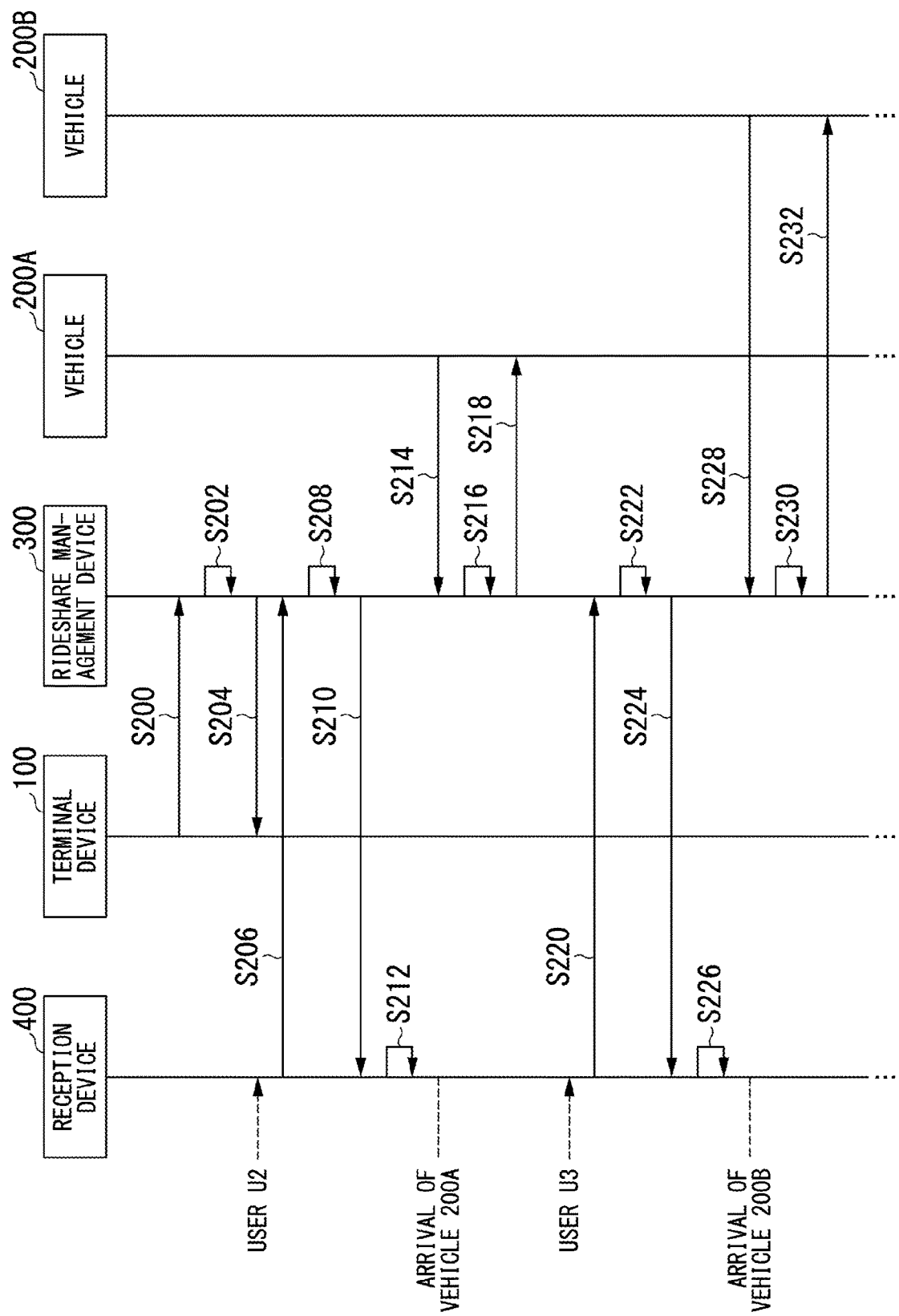
FIG. 8 is a sequence diagram showing a process performed by the rideshare management system 1 at the time of pick-up of a vehicle.

FIG. 8 is a sequence diagram showing a process performed by the rideshare management system 1 at the time of pick-up of a vehicle. First, when it is determined that the own device (the user U1) is approaching the pick-up place using a function of the rideshare application 110, the terminal device 100 requests the rideshare management device 300 to perform settlement in response to a reserved boarding request (step S200). In this case, the terminal device 100 transmits information for instructing the user ID and the settlement to the rideshare management device 300. When the request for the settlement is made, the rideshare management device 300 derives a usage fee according to the received user ID and the previously transmitted boarding request and performs settlement of the derived price (step S202), and then transmits information indicating completion of the settlement or information for generating a ticket to the terminal device 100 (step S204). The settlement is performed by withdrawing the fee from a bank account set in advance for the user ID or adding a charged usage price of the terminal device 100.

When the rideshare management device 300 is requested to perform settlement for the use of the vehicle associated with the reserved boarding request or the settlement is completed, the arrival situation monitor 340 detects that "the user approaches the pick-up place." When the positional information transmitted by the terminal device 100 is within a predetermined distance from the pick-up place, the arrival situation monitor 340 may detect that the user approaches the pick-up place.

The service publisher 360 of the rideshare management device 300 may transmit, for example, information for displaying an image representing a privilege on a display (privilege information) to the terminal device 100 along with the information indicating the completion of the settlement or after the settlement is completed.

Subsequently, when the user U2 arrives at a store and performs an operation for a settlement process on the touch panel 410 of the reception device 400, the reception device 400 requests the rideshare management device 300 to perform settlement (step S206). In this case, the reception device 400 requests the user U2 to input the user ID and transmits the input user ID and the information indicating settlement to the rideshare management device 300. When the request for the settlement is made, the rideshare management device 300 performs settlement of the price derived as in step S120 (step S208) and transmits information indicating the completion of the settlement and information for generating a ticket to the reception device 400 (step S210). When the reception device 400 receives the information indicating the completion of the settlement and the information for generating the ticket, the reception device 400 causes the printing device 420 to print the ticket (step S212).

When the operation for the settlement process on the touch panel 410 of the reception device 400 is performed or the rideshare management device 300 performs the settlement of the derived usage price, the arrival situation monitor 340 detects that "the user approaches the pick-up place."

The controller 440 of the reception device 400 may cause the privilege information to be printed on a medium and issued along with the ticket using the printing device 420.

At this time, the vehicle 200A is assumed to arrive at the pick-up place at which the reception device 400 is provided. The rideshare management device 300 acquires positional information transmitted by the vehicle 200A (step S214) and recognizes that the vehicle 200A arrives at the pick-up place according to the acquired information.

Subsequently, the rideshare management device 300 determines that the users U1 and U2 arriving at the pick-up place are allowed to get into the arrived vehicle 200A (step S216) and transmits information such as the user IDs of the boarding users, the destination, and one-time key to the vehicle 200A and instructs the vehicle 200A to head for destinations after the users U1 and U2 get into the vehicle (step S218). The user U1 or U2 is an example of a "first user." The vehicle 200A is an example of a "first vehicle."

Subsequently, when the user U3 arrives at the store and performs an operation for a settlement process on the touch panel 410 of the reception device 400, the reception device 400 requests the rideshare management device 300 to perform the settlement (step S220). In this case, the reception device 400 requests the user U3 to input the user ID and transmits the input user ID and the information indicating settlement to the rideshare management device 300. Subsequently, when the request for the settlement is made, the rideshare management device 300 performs settlement of the usage price derived as in step S208 (step S222) and transmits information indicating the completion of the settlement and information for generating a ticket to the reception device 400 (step S224). When the reception device 400 receives the information indicating the completion of the settlement and the information for generating the ticket, the reception device 400 causes the printing device 420 to print the ticket (step S226).

At this time, the vehicle 200B is assumed to arrive at the pick-up place at which the reception device 400 is provided. The rideshare management device 300 acquires positional information transmitted by the vehicle 200B (step S228) and recognizes that the vehicle 200B arrives at the pick-up place according to the acquired information.

Subsequently, the rideshare management device 300 determines that the user U3 arriving at the pick-up place is allowed to get into the arrived vehicle 200B (step S230) and transmits information such as the user ID of the boarding user, the destination, and one-time key to the vehicle 200B and instructs the vehicle 200B to head for destinations after the user U3 gets into the vehicle (step S232). The user U3 is an example of a "second user." The vehicle 200B is an example of a "second vehicle."

As described above, the rideshare management device 300 can realize more efficient rideshare administration by dynamically changing and adjusting the service schedule.

In the above-described process, the vehicles 200A and 200B are allocated before the users perform the settlement, as described above. However, a timing at which the vehicle 200A or 200B is allocated may be any timing (for example, after the settlement) after the user makes the boarding request.

In the process of step S216, even when the number of persons who can get into the vehicle 200A is not zero (when the user U3 can get into the vehicle 200A) and when the arrival situation monitor 340 estimates that the user U3 approaches a predetermined place after the vehicle 200A arrives at a predetermined place and a predetermined time passes, the service manager 330 may determine that the user U3 is a user allowed to get into the vehicle 200B arriving at the predetermined place later than the vehicle 200A. In this case, for example, the rideshare management device 300 acquires positional information of the user U3 when the vehicle 200A arrives at the predetermined place, and estimates a time until the user U3 arrives at the predetermined place according to the acquired positional information. For example, when the user U3 holds the terminal device 100 or the like, the terminal device 100 transmits the positional information of the user U3 at the time of arrival of the vehicle 200A at the predetermined place to the rideshare management device 300.

When the number of persons who can get into the vehicle 200A is one or more (in the foregoing example, when the users U1 to U3 can get into the vehicle) or when the arrival situation monitor 340 estimates that the user U3 approaches the predetermined place before the vehicle 200A arrives at the predetermined place and the predetermined time passes, the service manager 330 may determine the user U3 as a user allowed to get into the vehicle 200A.

Figure 9:
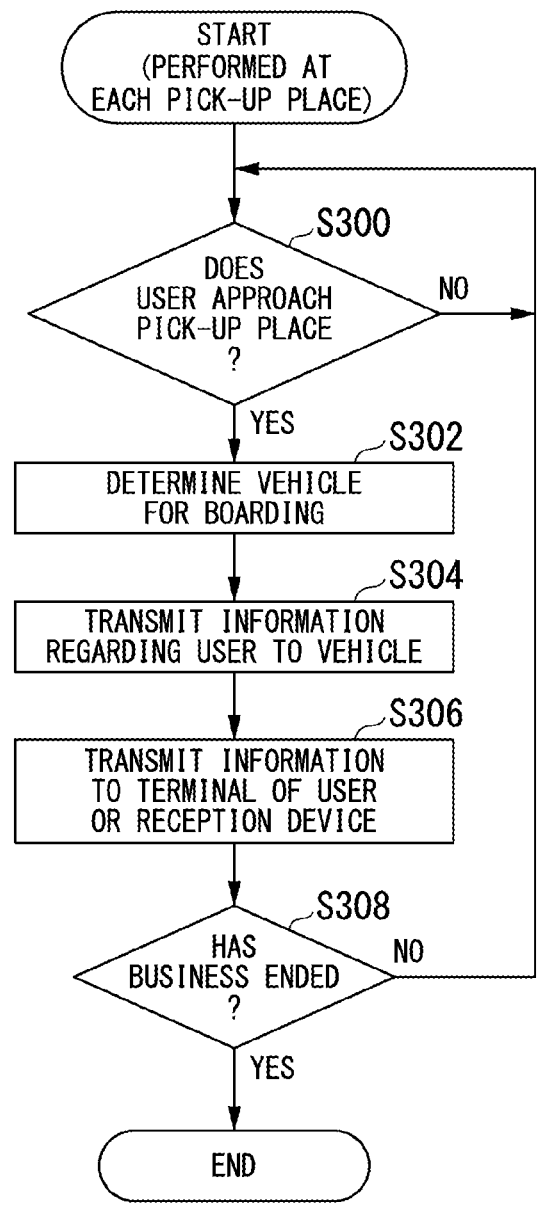
FIG. 9 is a flowchart (part 1) showing a flow of a process performed by the rideshare management device 300.

FIG. 9 is a flowchart (part 1) showing a flow of a process performed by the rideshare management device 300. The process is a process performed for each predetermined pick-up place.

First, the arrival situation monitor 340 determines whether the users transmitting the boarding requests approach the pick-up place (step S300). When the users approach the pick-up place, the service manager 330 determines vehicles into which the users approaching the pick-up place get (step S302). The vehicles into which the users approaching the pick-up place get may be vehicles into which the users are scheduled to get before the users approach the pick-up place or may be different vehicles. The different vehicles are, for example, vehicles in which destinations matching destinations of the users are set and are vehicles arriving at the pick-up place or scheduled to arrive within a predetermined time when the users approach the pick-up place. For example, the service manager 330 determines vehicles into which the users get so that the boarding conditions of the users are satisfied and the vehicles managed in the rideshare management system 1 can be efficiently operated at a time point at which the users approach the pick-up place.

Subsequently, the service manager 330 transmits information regarding a boarding user to the vehicle into which the user gets (step S304). Subsequently, the service manager 330 transmits information according to the service schedule in which a process result of step S302 is reflected to the terminal device 100 of the user or the reception device 400 (step S306). The transmission of the information according to the service schedule to the terminal device 100 of the user or the reception device 400 is an example of supply of an arrival time of the vehicle at the predetermined place to the user or supply of information for specifying the vehicle heading for the predetermined place to the user. The service manager 330 may supply the user with information for using an occupiable portion of the vehicle. The occupiable portion is a space in which an object such as a seat or luggage can be loaded. The information for using the occupiable portion is information regarding a one-time key for opening a door, a code for boarding, a boarding position, a door position, an occupation position, or the like. Subsequently, the service manager 330 determines whether business of rideshare at a pick-up point has ended (step S308). When the business has not ended, the process returns to step S300. When the business has ended, the process of the flowchart ends.

Figures 10, 11:
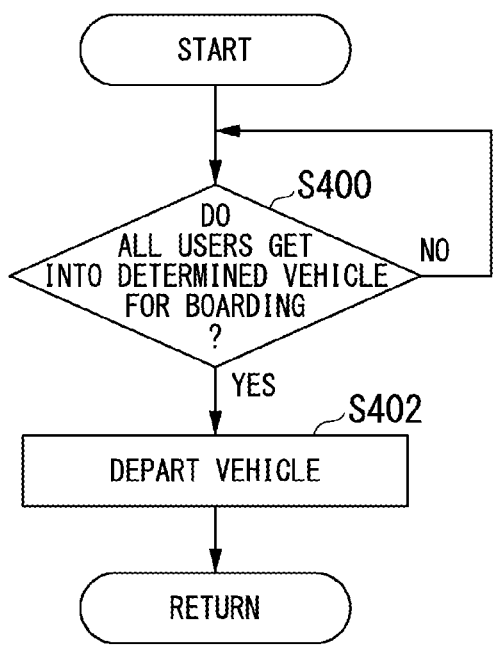
FIG. 10 is a diagram showing an example of an image displayed on a display of a terminal device 100 or a reception device 400.
FIG. 11 is a flowchart (part 2) showing the flow of a process performed by the rideshare management device 300.

The terminal device 100 or the reception device 400 displays the image IM of FIG. 10 on a display of the own device when the service schedule in which the process result of step S302 is reflected is received from the rideshare management device 300. FIG. 10 is a diagram showing an example of an image displayed on a display of the terminal device 100 or the reception device 400. For example, user IDs, information indicating characteristics of the vehicles into which boarding is scheduled or information for identification (for example, a number, color of the body of the vehicle, a shape, or an image indicating the vehicle), a scheduled arrival time of the vehicle at the pick-up place, a current traveling position of the vehicle, and the like can be associated and drawn with the image IM. Whenever the service schedule is changed, the image displayed on the display is changed into an image in which the change is reflected.

FIG. 11 is a flowchart (part 2) showing the flow of a process performed by the rideshare management device 300. First, the service manager 330 determines whether all the users get into the vehicle for boarding users determined in step S302 according to the vehicle information acquired from the vehicle 200 (step S400). When all the users get into the vehicle, the service manager 330 transmits an instruction for departure of the vehicle into which the occupants get (step S402), and then the process of one routine of the flowchart ends.

As described above, the rideshare management device 300 determines the vehicle into which the users get according to the arrival situation of the users at the pick-up place, the user can depart for the destination without waiting for other users. In the rideshare management system, it is possible to realize more efficient administration.

When the service schedule is generated, the service manager 330 may grant an option to the terminal device 100 transmitting the boarding request with regard to the boarding request transmitted by the terminal device 100. The option is an option to select a vehicle in which a space is occupied simultaneously (for example, ridden together) with another user or for the user associated with the boarding request to occupy the vehicle. In this case, the service manager 330 acquires information which is a result selected by the user, is transmitted by the terminal device 100, and indicates the riding-together or the occupation, and generates a service schedule according to the acquired information.

The service manager 330 may preferentially allocate a vehicle into which another user is likely to ride together in response to a boarding request transmitted by the terminal device 120 or the terminal device 130.

Figure 12:
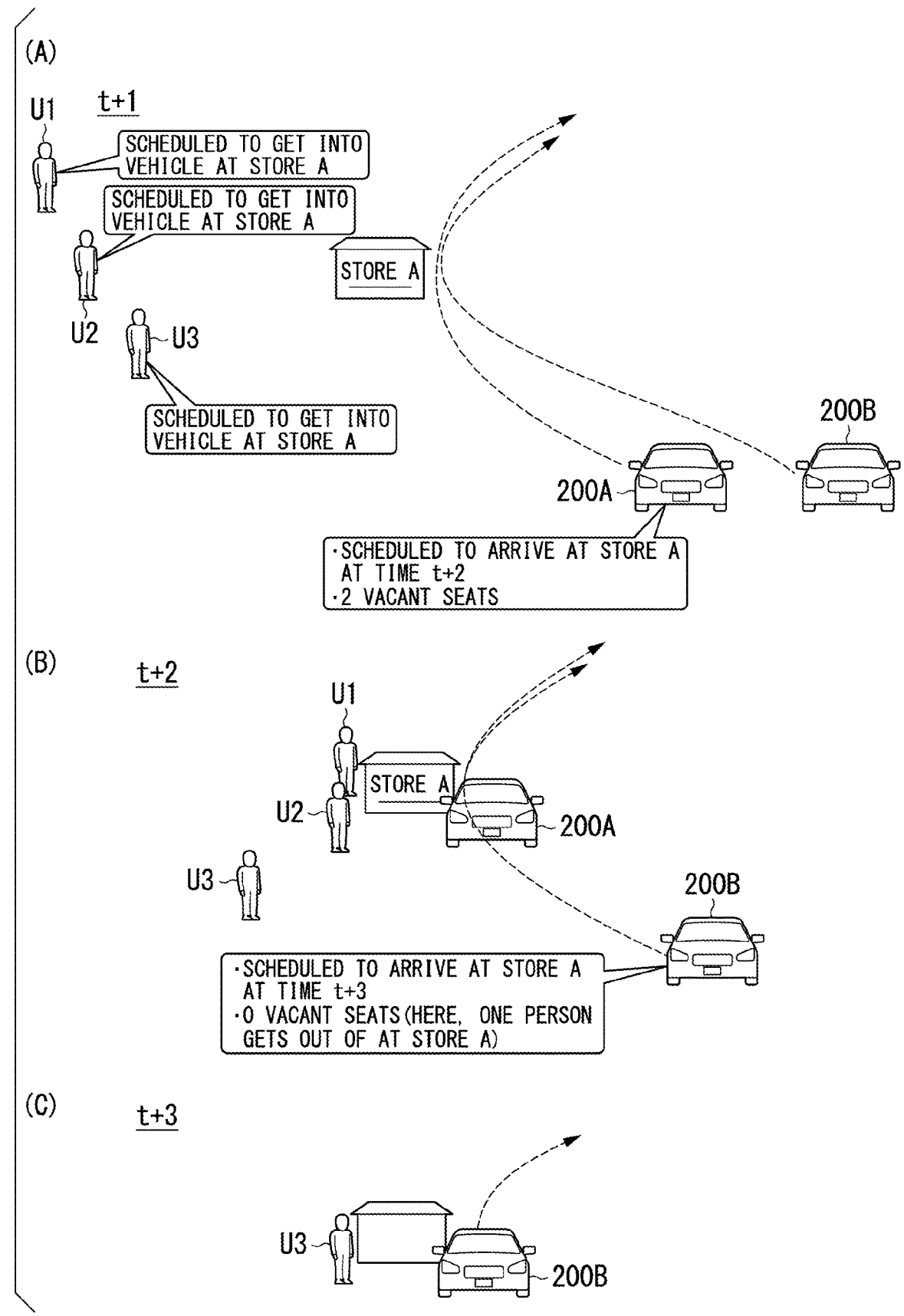
FIG. 12 is a diagram showing an example of movement states of users U1 to U3 and the vehicle 200.

FIG. 12 is a diagram showing an example of movement states of the users U1 to U3 and the vehicle 200. (A) in FIG. 12 *shows* the users and movement states of the vehicles at time t+1, (B) in FIG. 12 shows the users and movement states of the vehicles at time t+2, and (C) in FIG. 12 shows the users and movement states of the vehicles at time t+3. As shown in (A) of FIG. 12, the users U1 to U3 at time t+1 are assumed to transmit boarding requests to the rideshare management device 300. The pick-up place is assumed to be a store A. The service manager 330 transmits an instruction to arrive at the store A at time t+2 to the vehicle 200A. The number of vacant seats of the vehicle 200A is "2."

As shown in (B) of FIG. 12, the users U1 and U2 are assumed to arrive at the store A at time t+2. The service manager 330 allows the users U1 and U2 arriving at the store A to get into the vehicle 200A and transmits an instruction to depart to a destination of the occupant of the vehicle 200 to the vehicle 200A. The service manager 330 instructs the vehicle 200B into which the user U3 gets to head for the store A. The vehicle 200B is a vehicle which is scheduled to arrive at the store A at time t+3 and is a vehicle of which the number of seats is currently zero and from which the occupant is scheduled to get out of at the store A.

As shown in (C) of FIG. 12, the user U3 and the vehicle 200B are assumed to arrive at the store A at time t+3. The service manager 330 allows the user U3 arriving at the store A to get into the vehicle 200B and transmits an instruction to depart to a destination of the occupant of the vehicle 200B to the vehicle 200B.

In the above-described example, when there are 3 vacant seats in the vehicle 200A, the vehicle 200A may depart toward the destination without waiting for the user U3 despite the case in which the vehicle 200A and the users U1 and U2 arrive at the store A. In this case, for example, the service manager 330 may determine whether the vehicle 200A is allowed to depart toward the destination without waiting for the user U3 in accordance with a situation of vehicles which are near the store A. Specifically, when there is a vehicle which arrives at the store A within a predetermined time after the departure of the vehicle 200A and into which the user U3 can get or when there is a vehicle which is within a predetermined distance from the store A and into which the user U3 can get, the service manager 330 allows the vehicle 200A to depart toward the destination.

Figure 13:
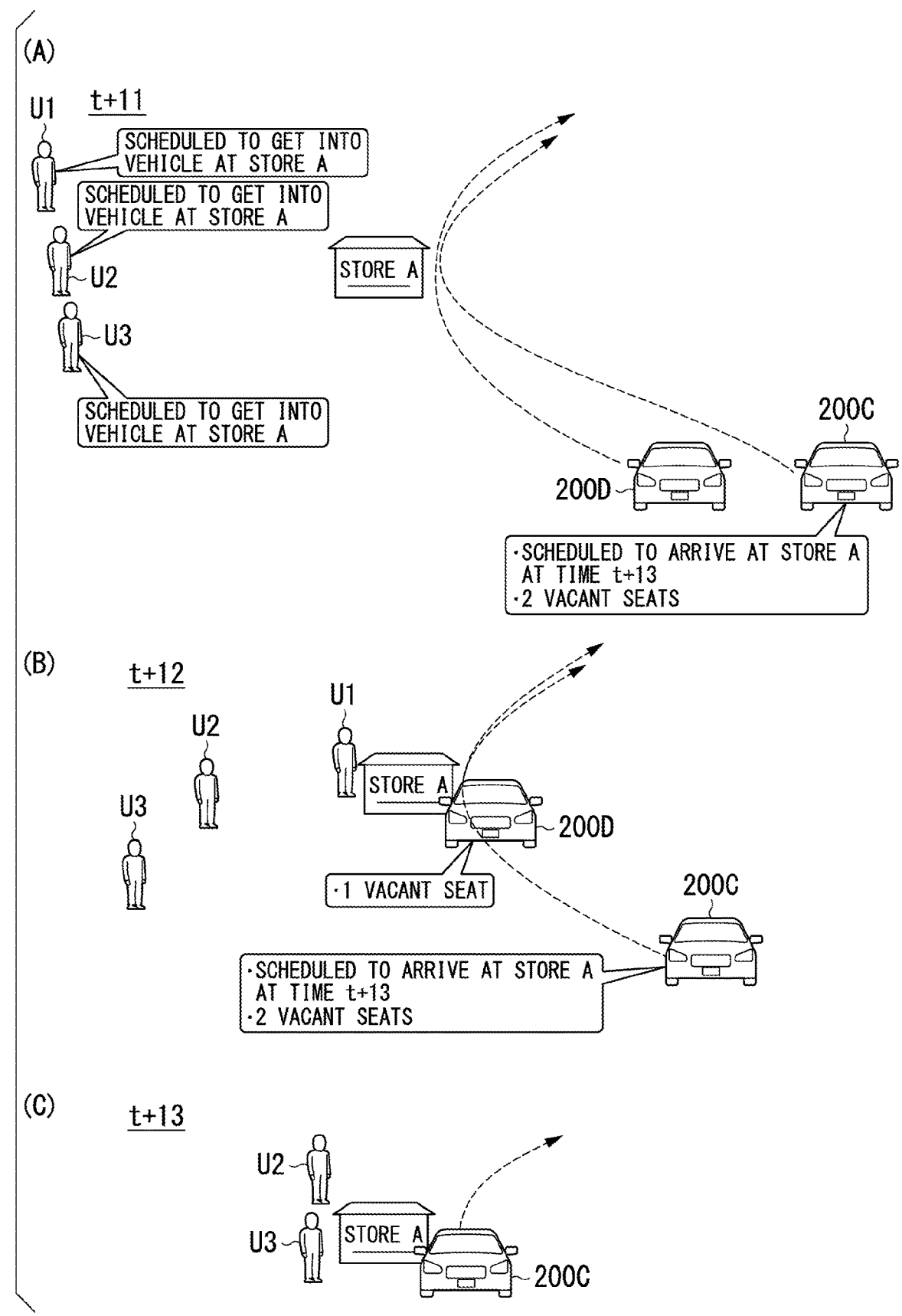
FIG. 13 is a diagram showing another example of movement states of users U1 to U3 and the vehicle 200.

FIG. 13 is a diagram showing another example of movement states of the users U1 to U3 and the vehicle 200. (A) in FIG. 13 shows the users and movement states of the vehicles at time t+11, (B) in FIG. 13 shows the users and movement states of the vehicles at time t+12, and (C) in FIG. 13 shows the users and movement states of the vehicles at time t+13. As shown in (A) in of FIG. 13, the users U1 to U3 at time t+11 are assumed to transmit boarding requests to the rideshare management device 300. The pick-up place is also assumed to be a store A. The service manager 330 transmits an instruction to arrive at the store A at time t+13 to the vehicle 200C.

As shown in (B) of FIG. 13, the user U1 is assumed to arrive at the store A at time t+12. A vehicle 200D is assumed to drop by at the store A so that the occupant gets out of. A destination of the vehicle 200D is assumed to match the destination of the user U1. In this case, the service manager 330 determines a vehicle into which the user U1 gets as the vehicle 200D and transmits information for prompting the user U1 to get into the vehicle 200D to the terminal device 100 of the user U1. The service manager 330 transmits an instruction to allow the user U1 to get into the vehicle and depart to the destination to the vehicle 200D. For example, the vehicle 200D acquires information regarding a ticket held by the user U1 from the rideshare management device 300. The ticket authentication device 270 permits the user U1 to get into the vehicle when the user U1 holds up the ticket to a reader of the own device.

As shown in (C) of FIG. 13, the users U2 and U3 and the vehicle 200C are assumed to arrive at the store A at time t+13. The service manager 330 allows the users U2 and U3 arriving at the store A to get into the vehicle 200C and transmits an instruction to depart to a destination of the occupant of the vehicle 200C to the vehicle 200C.

As described above, the rideshare management device 300 determines occupants who get into the vehicle at the pick-up place according to an arrival situation of the users at the pick-up place, and thus can improve convenience for the users. For example, the user having arrived earlier can get into the vehicle without waiting for a user whose an arrival time at the pick-up place is not known. Even when arrival times of the users U1 to U3 at the pick-up place are different, the rideshare management system 1 can allow an occupant to get into a vehicle into which the arriving users can get and allow the users arriving at the pick-up place later to get into another vehicle, and thus can efficiently operate the vehicle. As a result, it is possible to realize more efficient administration.

Figure 14:
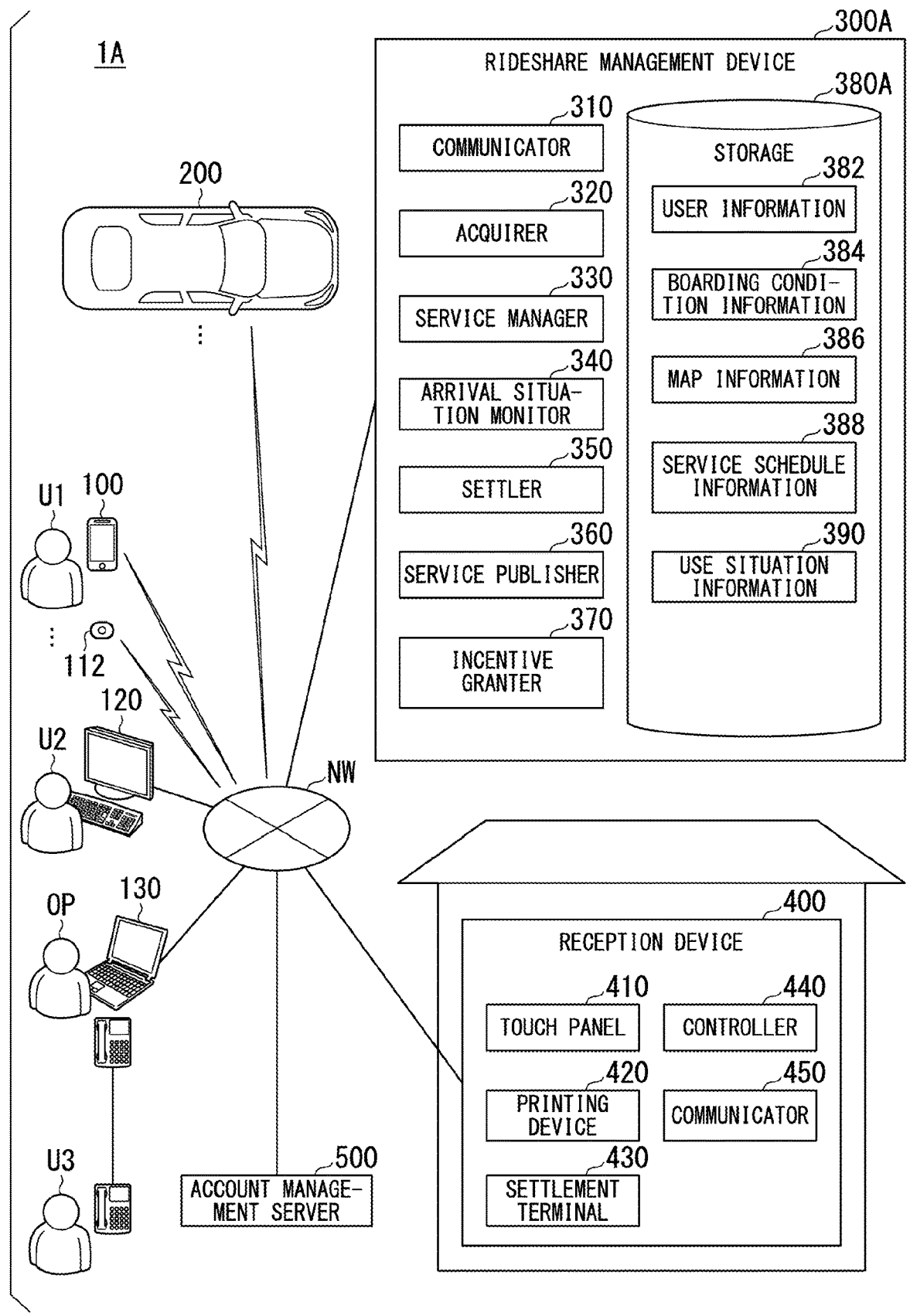
FIG. 14 is a diagram showing a functional configuration of a rideshare management system 1A.

The rideshare management device 300 (an incentive granter 370) may grant incentive information to a store or a user with reference to a use situation of the store and a use situation of the vehicle. The incentive information is, for example, information indicating an amount of money or content of a privilege. In this case, a rideshare management system 1A includes a rideshare management device 300A instead of the rideshare management device 300. FIG. 14 is a diagram showing a functional configuration of the rideshare management system 1A. The rideshare management device 300A further includes the incentive granter 370 in addition to the functional configuration of the rideshare management device 300.

Use situation information 390 is stored in a storage 380A of the rideshare management device 300. The use situation information 390 includes, for example, the number of boarding requests from each user, the number of settlements, a settlement amount, the number of settlements (a settlement amount) in a store in which the reception device 400 is provided, the number of times the store is used as the pick-up place, and the number of users using the store as the pick-up place. The information included in the foregoing use situation information 390 is, for example, information acquired by the rideshare management device 300 from a process result of the own device, the reception device 400, or a terminal device provided in the store.

For example, the incentive granter 370 determines content of the incentive information to be granted to the store or the user with reference to the use situation information 390. For example, the larger the number of times the user uses a rideshare service is, the larger an incentive amount granted to the user is. For example, the larger the number of times the store is used as the pick-up place is, the larger an incentive amount granted to the store is. The granting is transmitting information regarding a privilege such as discount used by the user in rideshare or the store to the terminal device 100, instructing the account management server 500 to transfer money associated with the incentive amount to a preset bank account of the store via the network NW, or the like.

The incentive granter 370 may determine, for example, content of the incentive information received from the store with reference to the use situation information 390. For example, the larger the number of times the store is used as the pick-up place, the larger the incentive amount received from the store is. For example, the incentive granter 370 transmits information indicating the determined incentive amount to a terminal or the like provided in the store and instructs the terminal or the like to transfer money associated with the incentive amount to a preset bank account of the store. Through the above-described process, the incentive granter 370 can acquire an incentive from the store for which attracting guests increase since the number of times the store is used as the pick-up place.

In the foregoing embodiment, when the boarding request is transmitted to the rideshare management device 300 in order for the user to get into the vehicle 200 and the rideshare management device 300 acquires the boarding request, the vehicle 200 matching the use condition defined in the boarding request is searched for, as described above, but the present invention is not limited thereto. For example, the user may transmit a use request to the rideshare management device 300. The vehicle 200 used for rideshare may be the vehicle 200 that carries luggage or passengers or may be the vehicle 200 that carries luggage and passengers together.

The use request is a request indicating that the user desires to use the vehicle 200. For example, the user transmits the use request to the rideshare management device 300 to load luggage in the vehicle 200, to unload luggage loaded in the vehicle 200, to help an occupant getting into the vehicle 200, or to allow a user different from the user transmitting the use request to get into the vehicle 200. The user may transmit the use request to the rideshare management device 300 in order to join with the vehicle 200 or come into touch with the vehicle 200 or a person or an object inside the vehicle 200. For example, the user may transmit the use request to the rideshare management device 300 in order to inspect, check, or work the vehicle 200, the inside of the vehicle 200, or luggage or the like loaded in the vehicle 200, join with an occupant of the vehicle 200, or examine an occupant of the vehicle 200.

Then, in response to the use request, the rideshare management device 300 searches for the vehicle 200 matching a condition defined in the use request. The matching to the condition defined in the use request is, for example, presence of a space in which luggage is loaded inside the vehicle 200, traveling of the vehicle 200 allocated near a desired time to the pick-up place (near the pick-up place), and matching a destination of with a destination of the luggage (the user) in the case of the use request to load the luggage in the vehicle 200.

Instead of (or in addition to) the boarding condition information 384, for example, use condition information is stored in the storage 380. The use condition information is, for example, information in which a desired access place, a destination, a desired access time (a desired time at which a user and the vehicle 200 join), an allocate flag indicating whether allocate is determined, and the like are associated with a user ID which is identification information of a user registered in advance.

For example, the service manager 330 searches for the available vehicle 200 with reference to the use condition information, the map information 386, and the service schedule information 388. The map information 386 includes pick-up place information indicating an overview of various pick-up places in addition to information regarding nodes or links. The pick-up place information is, for example, information in which a position, content of a pick-up place, a correspondence range which is one or more desired access places, and the like are associated with a pick-up place ID which is identification information of the place at which the vehicle 200 joins with a user.

In the service schedule information 388, for example, a kind, a size, and a weight of a loaded object or an unloaded object and an action to be performed are associated with a departure place, a transit place, or a destination. The storage 380 stores information regarding a kind, a size, and a weight of luggage which can be loaded in the vehicle 200. The service manager 330 determines a user who uses the vehicle 200 at a predetermined place according to an arrival situation of a user monitored by the arrival situation monitor 340.

For example, the service manager 330 specifies a pick-up place associated with a desired access place included in the boarding request with reference to the map information 386 and extracts a record in which the specified pick-up place is the same and a desired use time is within a predetermined time from the use condition information. Then, the service manager 330 allocates the vehicle 200 which can be used within a predetermined time (for example, 30 minutes or 1 hour) from a time close to the desired use time of the user or the desired use time. The vehicle 200 to be allocated is, for example, the vehicle 200 which matches a destination designated by the user and of which at least a part of an occupiable portion can be occupied and used by the user among the vehicles 200 traveling at the pick-up place (near the pick-up place) near a desired boarding time. The fact that the occupiable portion can be occupied and used is, for example, the fact that luggage loaded by a user can be loaded in the occupiable portion or a user or a person designated by the user can get into a vehicle.

The rideshare management device 300 may perform the process (step S216) of determining that the users U1 and U2 arriving at the pick-up place are allowed to get into the arrived vehicle 200 as follows. For example, when the first user included in a plurality of users approaches a predetermined place before the second user included in the plurality of users approaches the predetermined place and when the first vehicle 200 allocated by the service manager 330 arrives at the predetermined place, the service manager 330 determines the first user as a user who occupies a part of the first vehicle 200 and performs the process of (1) or (2) below. (1) For example, when the occupiable portion of the first vehicle 200 is occupied and thus occupation is not possible, the service manager 330 determines the second user as a user who arrives at the predetermined place later than the first vehicle 200 and occupies a part of the second vehicle 200 that has an occupiable portion associated with the use information requested by the second user. (2) For example, the service manager 330 determines the second user as a user who arrives at the predetermined place later than the first vehicle 200 and occupies a part of the second vehicle 200 that has an occupiable portion corresponding to the use information requested by the second user, for example, according to comparison between a scheduled time of arrival of the second user at the predetermined place estimated according to information observed by the arrival situation monitor 340 and a time at which the first vehicle 200 arrives at the predetermined place. The occupation completion is non-presence of a seat on which a user gets into, occupation of a seat on which a user gets, non-presence of a space in which luggage is loaded, loading of another luggage in a loading space, or the like. The observed information is information indicating that "a user approaches a pick-up place."

For example, when it is estimated that a scheduled time of arrival of the second user at the predetermined place estimated according to the information observed by the arrival situation monitor 340 is longer than an arrival time of the first vehicle 200 at the predetermined place by a predetermined time, the service manager 330 determines the second user as a user who arrives at the predetermined place later than the first vehicle 200 and occupies a part of an occupiable portion of the second vehicle 200 that has the occupiable portion associated with the use information requested by the second user. The fact that "the vehicle that has the occupiable portion associated with the use information requested by the second user is included" is, for example, the fact that the vehicle has an occupiable portion on which an object desired to be loaded by the second user can be loaded or a person desiring to get into the vehicle can get into the vehicle.

When the occupiable portion of the first vehicle 200 after the occupation by the first user matches the use condition requested by the second user or when the arrival situation monitor 340 estimates that the second user approaches the predetermined place at a specific time, the service manager 330 may determine the second user as a user who occupies a part of the occupiable portion of the first vehicle 200. The specific time is a time in which the first vehicle 200 arrives at the predetermined place and the predetermined time does not passes. The fact that occupiable portion matches the use condition is, for example, the fact that a heading direction of the second user matches a heading direction of the first vehicle 200 and the second user can get into the first vehicle 200 or there is luggage which the second user loads in the first vehicle 200 (a space to be occupied).

When there is an occupiable portion which is unreserved in the first vehicle 200 after the first user occupies the occupiable portion of the first vehicle 200, the service manager 330 determines the second user as a user who occupies the occupiable portion which is unreserved in the first vehicle 200 regardless of an estimated time of arrival of the second user. In this case, it is considered that the second user is a service provider of a store or the like (which is at the pick-up place or near the pick-up place) associated with the pick-up place and the service provider that is the second user to have already arrived at the pick-up place. As a result, when there is the vacant occupiable portion in the vehicle 200, the service provider of the store or the like can efficiently utilize the first vehicle 200 for delivery or the like.

Figure 15:
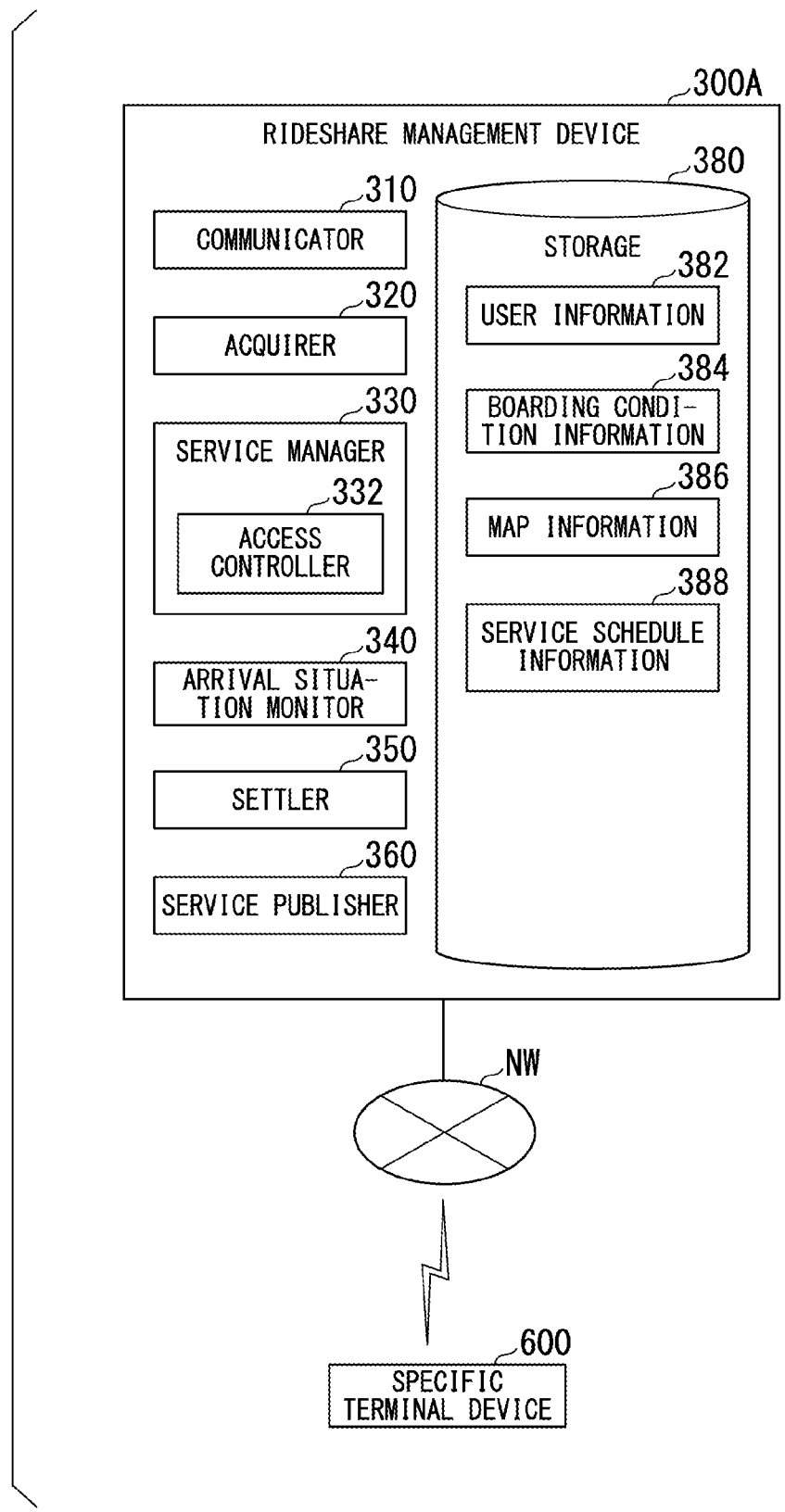
FIG. 15 is a diagram showing an example of a functional configuration of a rideshare management device 300A including an access controller 332 and a specific terminal device 600 used by a third party.

The service manager 330 may further include an access controller 332 that sets a stop position at which the vehicle 200 stops on the way and permits a third party to access an occupiable portion at the stop position. FIG. 15 is a diagram showing an example of a functional configuration of a rideshare management device 300A including the access controller 332 and a specific terminal device 600 used by a third party. The specific terminal device 600 may be, for example, a terminal device such as a smartphone or a tablet terminal that can be carried by a user or may be a personal computer.

The access controller 332 may notify the third party accessing an occupiable portion (an occupiable portion on which the user gets into or an occupiable portion on which luggage is loaded) of the vehicle 200 or an occupant (or an object) which is on the occupiable portion of information for accessing the occupiable portion (for example, a one-time key for opening a door of the vehicle 200) or information regarding the vehicle 200 before the vehicle 200 stops at the stop position or before or when the third party joins with the vehicle 200. The foregoing stop position may be a position designated by the third party or may be a position designated by a user different from the third party (for example, a user transmitting a use request). For example, the access controller 332 may notify the specific terminal device 600 that has identification information stored in advance in the storage 380 of the information for accessing the occupiable portion, the foregoing stop position, or the information regarding the vehicle 200. For example, the specific terminal device 600 notified of the information for accessing the occupiable portion is the specific terminal device 600 designated by the user in association with the use request, the specific terminal device 600 to which an authority is granted in advance, or the like.

The vehicle 200 may have a plurality of partitioned occupiable portions and may be configured so that access is limited for each of the partitioned occupiable portions. For example, in the vehicle 200, a plurality of rooms or lockers may be provided and each room or locker may be configured to be locked. In this case, the specific terminal device 600 acquires information for accessing a room or a locker to which an authority is granted in advance. In this way, by notifying the third party of the information for accessing, it is possible to finish a job performed by transferring goods or allowing the third party and the vehicle 200 to join.

According to the above-described embodiment, by including the communicator 310 configured to communicate with the plurality of terminal devices 100, 120, and 130 used by a plurality of users; the acquirer 320 configured to acquire use requests from the plurality of users in which a use condition including at least a desired access place is defined; the arrival situation monitor 340 configured to monitor an arrival situation of the users at a predetermined place derived according to the desired access place; and the service manager 330 configured to search for an available vehicle according to the use condition included in the use requests and determine a vehicle service schedule and configured to determine a user accessing the vehicle at the predetermined place according to the arrival situation of the users monitored by the arrival situation monitor 340, it is possible to realize the more efficient administration.

The rideshare management device 300 may be mounted in the vehicle 200. When the vehicle 200 is a non-automated driving vehicle, the communicator 310 may communicate with a terminal device of a driver of the vehicle 200 via the network NW.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rideshare management system comprising:
a communicator configured to communicate with a plurality of terminal devices used by a plurality of users;
an acquirer configured to acquire use requests from the plurality of users in which a use condition including at least a desired access place is defined;
a user arrival situation monitor configured to monitor an arrival situation of the users at a predetermined place derived according to the desired access place; and
a service manager configured to search for an available vehicle according to the use condition included in the use requests and determine a vehicle service schedule and configured to determine a user accessing the vehicle at the predetermined place according to the arrival situation of the users monitored by the user arrival situation monitor,
wherein, when a first user included in the plurality of users approaches the predetermined place before a second user included in the plurality of users approaches the predetermined place and a first vehicle allocated by the service manager arrives at the predetermined place, and the service manager is configured to determine the first user as a user occupying a part of the first vehicle, and when an occupiable portion of the first vehicle is in an occupied state and is not occupiable or according to comparison between an estimated time of arrival of the second user at the predetermined place estimated according to information observed by the user arrival situation monitor and a time at which the first vehicle arrives at the predetermined place, the service manager is configured to determine the second user as a user who arrives at the predetermined place later than the first vehicle and occupy a part of a second vehicle that has an occupiable portion associated with use information requested by the second user.

2. The rideshare management system according to claim 1, wherein, among vehicles traveling near the predetermined place, the service manager is configured to allow one or more vehicles to head for the predetermined place, the one or more vehicles being vehicles of which at least parts are able to be occupied and used by the users and head in destination directions of the users.

3. The rideshare management system according to claim 1, wherein the service manager is configured to determine the second user as a user who occupies a part of the occupiable portion of the first vehicle when the occupiable portion of the first vehicle after the first user occupies the occupiable portion matches a use condition requested by the second user or when the user arrival situation monitor estimates that the second user approaches the predetermined place before a predetermined time passes after the first vehicle arrives at the predetermined place.

4. The rideshare management system according to claim 1,
wherein the second user is a service provider associated with the predetermined place, and
wherein, when there is an occupiable portion which is unreserved and is usable in the first vehicle after the first user occupies the occupiable portion of the first vehicle, the service manager is configured to determine the second user as a user who occupies the unreserved occupiable portion of the first vehicle regardless of the estimated time of arrival of the second user.

5. The rideshare management system according to claim 1, wherein the user arrival situation monitor is configured to monitor an arrival situation of the user at the predetermined place according to positional information specified by a position specifying device included in a terminal device held by the user.

6. The rideshare management system according to claim 1, wherein the user arrival situation monitor is configured to monitor the arrival situation of the user at the predetermined place according to an input operation performed on an input device provided at the predetermined place.

7. The rideshare management system according to claim 1, further comprising:
a service publisher configured to grant a usable privilege to a user associated with the use request with reference to a correspondence relation between the predetermined place and a service provider according to a use situation of the vehicles.

8. The rideshare management system according to claim 1,
wherein the predetermined place is a service provider, and
wherein the rideshare management system further comprises a granter that is configured to grant incentive information to a supervisor who manages the service provider, the users, or the rideshare management system with reference to a use situation of the service provider and a use situation of the vehicles.

9. The rideshare management system according to claim 1, wherein the service manager is configured to derive the predetermined place which is a use place with regard to the desired access place according to comparison between the desired access place and the predetermined place and is configured to supply information regarding the derived use place to the users.

10. The rideshare management system according to claim 1, wherein, when the acquirer is configured to acquire the use request transmitted by a portable first terminal device, the service manager is configured to grant an option to select a vehicle in which a space is occupied simultaneously with another user or for only the user associated with the use request to occupy the vehicle, to the portable first terminal device transmitting the use request.

11. The rideshare management system according to claim 1, wherein the service manager is configured to derive a time at which a vehicle heading for the predetermined place arrives at the predetermined place and is configured to supply the derived time to the users.

12. The rideshare management system according to claim 1, wherein the service manager is configured to supply the users with information for specifying a vehicle heading for the predetermined place.

13. The rideshare management system according to claim 1, wherein the service manager is configured to supply the user with information for using the occupiable portion of the vehicle.

14. The rideshare management system according to claim 1, wherein the service manager further includes an access controller configured to set a half-way stop position of the vehicle and permit access to the occupiable portion of the vehicle to a third party at the half-way stop position.

15. The rideshare management system according to claim 1, wherein the vehicle is an automated driving vehicle.

16. A rideshare management method comprising:
communicating with a plurality of terminal devices used by a plurality of users;
monitoring an arrival situation of the users at a predetermined place derived according to a desired access place;
searching for an available vehicle according to the use condition included in the use requests and determine a vehicle service schedule; and
determining a user accessing the vehicle at the predetermined place according to the monitored arrival situation of the users,
wherein, when a first user included in the plurality of users approaches the predetermined place before a second user included in the plurality of users approaches the predetermined place and a first vehicle that is allocated arrives at the predetermined place, determining the first user is a user occupying a part of the first vehicle, and
when an occupiable portion of the first vehicle is in an occupied state and is not occupiable or according to comparison between an estimated time of arrival of the second user at the predetermined place estimated according to information observed and a time at which the first vehicle arrives at the predetermined place, determining the second user is a user who arrives at the predetermined place later than the first vehicle and occupying a part of a second vehicle that has an occupiable portion associated with use information requested by the second user.

17. A non-transitory computer-readable storage medium that stores a computer program to be executed by a computer to perform at least:
 communicate with a plurality of terminal devices used by a plurality of users;
 acquire use requests from the plurality of users in which a use condition including at least a desired access place is defined;
 monitor an arrival situation of the users at a predetermined place derived according to the desired access place;
 search for an available vehicle according to the use condition included in the use requests and determine a vehicle service schedule; and
 determine a user accessing the vehicle at the predetermined place according to the monitored arrival situation of the users,
 wherein, when a first user included in the plurality of users approaches the predetermined place before a second user included in the plurality of users approaches the predetermined place and a first vehicle that is allocated arrives at the predetermined place, determining that the first user is a user occupying a part of the first vehicle, and
 when an occupiable portion of the first vehicle is in an occupied state and is not occupiable or according to comparison between an estimated time of arrival of the second user at the predetermined place estimated according to information observed and a time at which the first vehicle arrives at the predetermined place, determining that the second user is a user who arrives at the predetermined place later than the first vehicle and occupying a part of a second vehicle that has an occupiable portion associated with use information requested by the second user.

* * * * *